US011201951B2

(12) United States Patent
Shia

(10) Patent No.: US 11,201,951 B2
(45) Date of Patent: Dec. 14, 2021

(54) MULTI-ROLE GROUP INHERITANCE FOR INTERACTING COMPUTER SYSTEMS

(71) Applicant: So-Ming Daniel Shia, San Francisco, CA (US)

(72) Inventor: So-Ming Daniel Shia, San Francisco, CA (US)

( * ) Notice: Subject to any disclaimer, the term of this patent is extended or adjusted under 35 U.S.C. 154(b) by 0 days.

(21) Appl. No.: 16/862,335

(22) Filed: Apr. 29, 2020

(65) Prior Publication Data
US 2021/0344778 A1    Nov. 4, 2021

(51) Int. Cl.
*H04L 29/08* (2006.01)
*G06F 8/60* (2018.01)

(52) U.S. Cl.
CPC ............... *H04L 67/34* (2013.01); *G06F 8/60* (2013.01); *H04L 67/10* (2013.01)

(58) Field of Classification Search
CPC ..... G06F 8/60; H04L 12/1822; H04L 12/185; H04L 29/06; H04L 29/12009; H04L 45/00; H04L 45/02; H04L 45/54; H04L 63/065; H04L 63/08; H04L 63/104; H04L 67/02; H04L 67/10; H04L 67/104; H04L 67/1046; H04L 67/1048; H04L 67/1057; H04L 67/1065; H04L 67/1068; H04L 67/1089; H04L 67/34; H04L 69/24; H04L 69/329
See application file for complete search history.

(56) References Cited

U.S. PATENT DOCUMENTS

| 8,117,597 | B2   | 2/2012  | Shia |
|---|---|---|---|
| 8,539,441 | B2   | 9/2013  | Shia |
| 8,886,705 | B1 * | 11/2014 | Tewari ............... G06F 16/1837 709/203 |
| 9,871,667 | B2   | 1/2018  | Shia |
| 2003/0174731 | A1 * | 9/2003 | Tafazolli ................. H04L 29/06 370/469 |
| 2004/0088347 | A1 * | 5/2004 | Yeager .................. H04L 67/107 709/202 |
| 2004/0098447 | A1 * | 5/2004 | Verbeke ................ G06F 9/5055 709/201 |
| 2008/0046433 | A1 * | 2/2008 | Kool-Brown ....... G06F 16/9535 |

OTHER PUBLICATIONS

Castro et al. "Scalable Application-Level Anycast for Highly Dynamic Groups." 2003. Lecture Notes in Computer Science, vol. 2816. Springer, Berlin, Heidelberg, <https://doi.org/10.1007/978-3-540-39405-1_5> (Year: 2003).*

* cited by examiner

*Primary Examiner* — Jeffrey R Swearingen
(74) *Attorney, Agent, or Firm* — Brian N. Young; Fountainhead Law Group P.C.

(57) ABSTRACT

In some embodiments, a method receives a first interaction group that includes a plurality of roles. The plurality of roles comprise a first plurality of interaction modules that each define an activity. The method receives a second interaction group that includes a second plurality of interaction modules. The second interaction group identifies the first interaction group, and interaction modules in the second plurality of modules identify a role in the plurality of roles of the first interaction group. Then, an activity of the second plurality of interaction modules is generated for the second interaction group by retrieving the activity of an interaction module in the first plurality of interaction modules identified by a respective role for the interaction module in the second plurality of interaction modules.

20 Claims, 16 Drawing Sheets

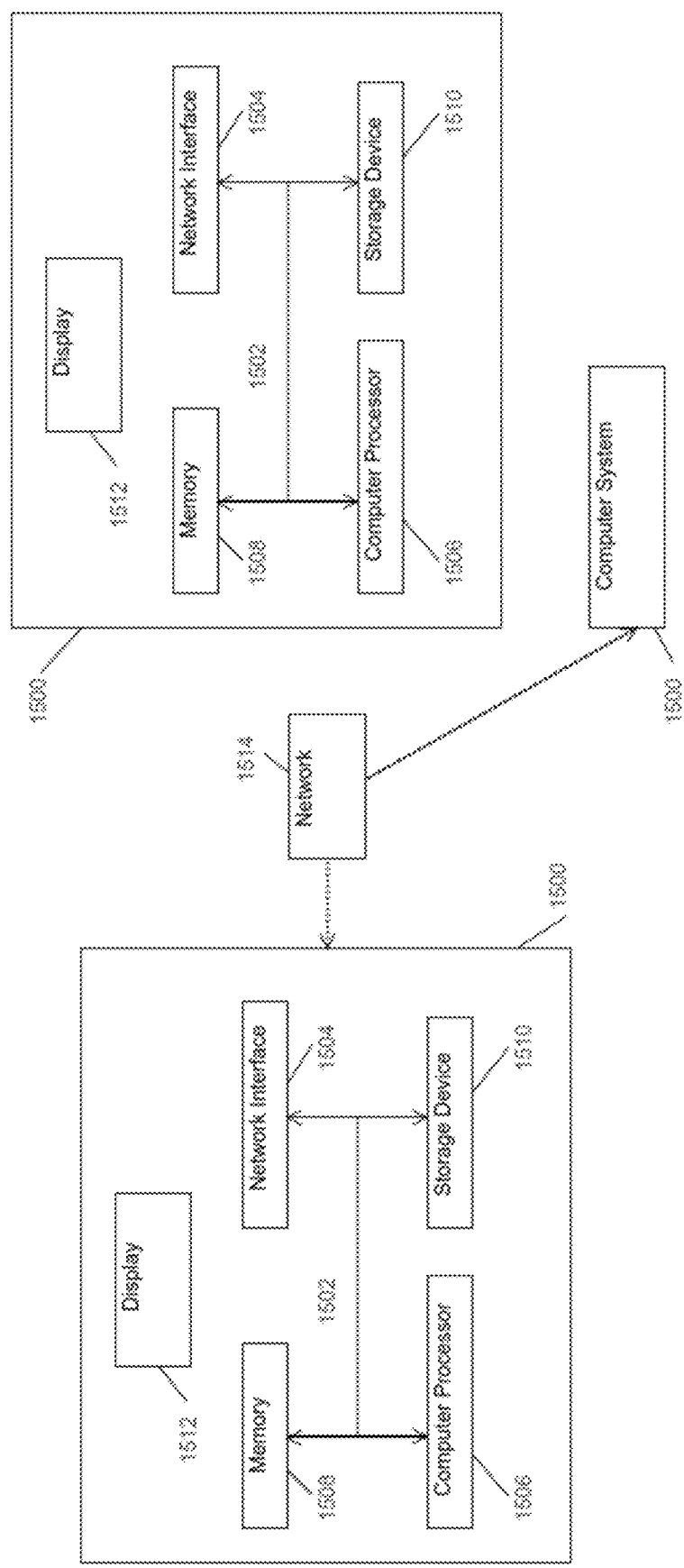

MULTI-ROLE GROUP INHERITANCE FOR INTERACTING COMPUTER SYSTEMS

BACKGROUND

When multiple computer systems need to send messages to each other, a protocol is typically defined to specify what messages can be send from one system to another and in what sequence. The sequence describes the order when a particular message is to be sent within the sequence of messages. Once this protocol is defined, corresponding participating activities can be developed in a software program for each computer system based on this protocol so that the computer systems can communicate with each other without errors.

If this protocol is shared by many separate applications of computer systems, in each application, the corresponding participating activity needs to be developed repeatedly. With the advent of Internet of Things (IoT), a typical application environment may have millions of connected devices, machines and robots, there may be thousands of types of communication protocols for application software running on these devices, machines and robots. Each computer system may need to configure many such participating activities in order to collaborate their activities with each other. This can be an error prone process, and the result is that these computer systems may fail to interoperate with each other correctly.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 15 illustrates an example of special purpose computer systems according to one embodiment.

DETAILED DESCRIPTION

Described herein are techniques for a computer system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Described herein are techniques for a system of multiple interacting software systems that can pass messages to each other and inter-operate seamlessly. Some embodiments reduce the complexity for configuring multiple interacting software systems and improve the efficiency for development and design of such software systems. Some embodiments provide a way to define an interaction group for a protocol with multiple roles so that each software system can inherit a particular role in a particulate interaction group to communicate with other software systems correctly. For example, the process ensures that these participating software systems can inter-operate with each other correctly in the protocol using the inheritance of roles within the inheritance group.

System Overview

Figure 1A:
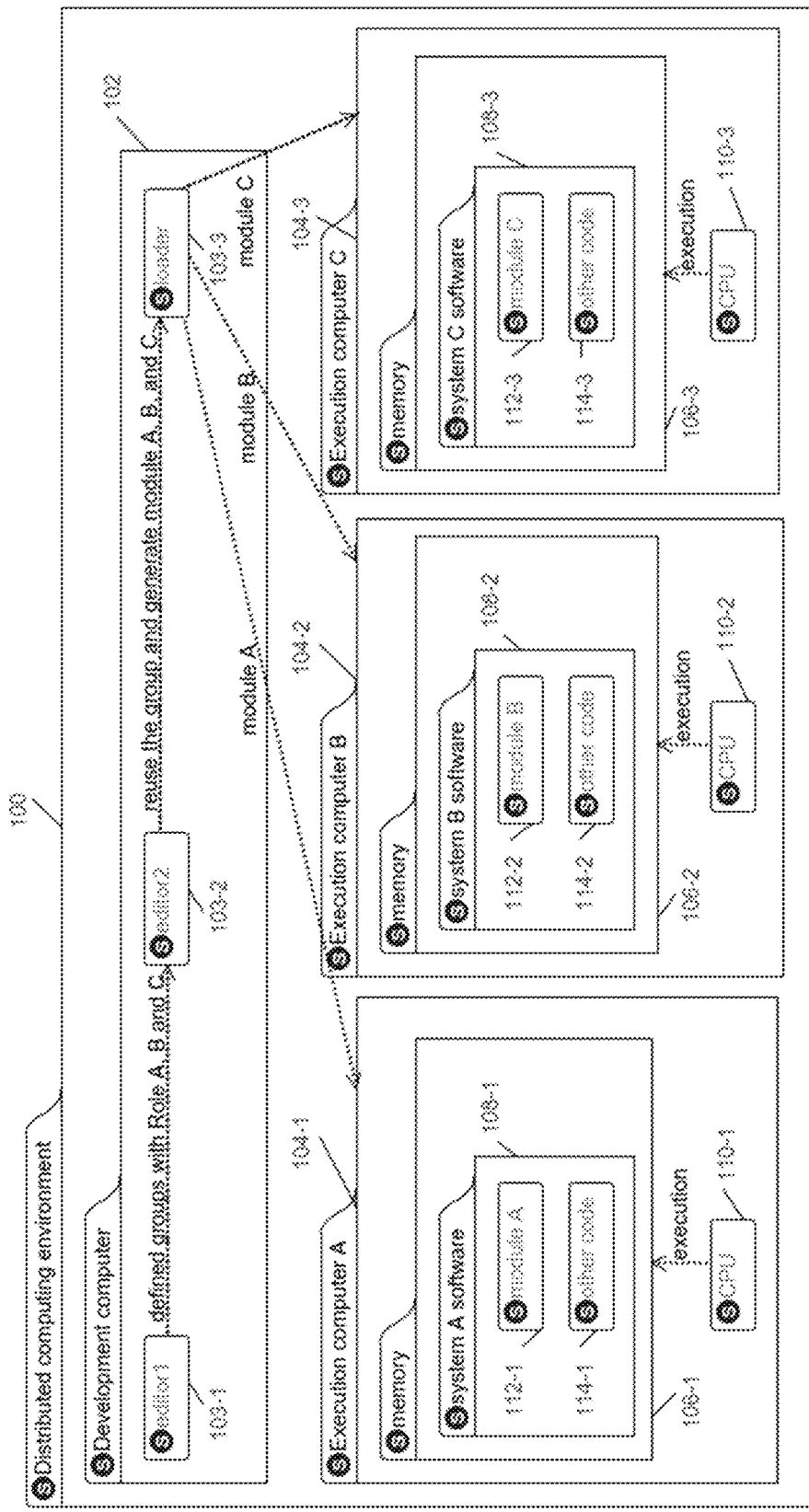
FIG. 1A depicts a distributed computing environment for designing multiple interacting software systems according to some embodiments.

FIG. 1A depicts a distributed computing environment 100 for designing multiple interacting software systems according to some embodiments. System 100 includes a development computer 102, an execution computer A 104-1, an execution computer B 104-2, and an execution computer C 104-3. Although three execution computers are shown, a system may include two or more execution computers in such a distributed computing environment. Development computer 102 may be used to configure execution computers 104 to interact. Execution computers 104 perform some activity, which may include one or more actions (e.g., actions that communicate of messages between computers).

In development computer 102, an editor1 103-1 is an editor application that creates a protocol that describes messages being exchanged among interacting execution systems. Although a single protocol may be described, editor1 103-1 may create multiple different protocols. In the protocol, editor1 103-1 creates a named interaction group with a number of named roles, such as Role A, B and C in this example. The interaction group is a group of execution computers 104 that interact using the protocol. The roles define different participating activities that should be performed according to the protocol.

After creating the interaction group and its roles, an editor2 103-2 creates software interaction modules that are configured to inherit the activity of the roles each software module participates in the interaction group. Each execution computer 104 may be configured with one or more software interaction modules so that each execution computer 104 can interact with other execution computers according to the description of that particular protocol. A software interaction module may include computer code that is executed by the CPU 110 to perform a communication activity that complies with the requirements of the associated role.

In addition to these communication activities of the roles, editor2 103-2 may add more non-communication activities that are needed by a specific execution computer 104. This step creates fully executable interaction modules that can be executed by execution computers 104 according to the description of that particular protocol. In some embodiments, the activities for the roles may be created based on input from a user or may be created automatically.

A loader 103-3 receives the interaction modules and can then load them into execution computer A 104-1, execution computer B 104-2, and execution computer C 104-3, respectively in order for these execution computers to communicate with each other.

Each execution computer 104 may receive a different interaction module from the interaction group depending on the participating computer's role in the interaction group. Without loading these interaction modules, these participating computers 104 cannot perform some communication activity, such as send and receive messages to each other, in order to collaborate and achieve some collective computation goals using the protocol. However, by executing these interaction modules, these participating computers 104 can interact with each other correctly so that a collective of computation goal of the protocol can be achieved by following logic configured in the interaction modules.

Each execution computer A, B, and C includes a memory 106-1, 106-2, and 106-3, respectively. Each memory 106-1, 106-2, and 106-3 includes system A software 108-1, system B software 108-2, and system C software 108-3, respectively. System software may be an operating system or other software that can be executed by a computer processing unit 110-1, 110-2, and 110-4 of the respective participating computers 104-1, 104-2, and 104-3. System A software 108-1, system B software 108-2, and system C software 108-3 store interaction module A 112-1, interaction module B 112-2, and interaction module C 112-3, respectively. System A software 108-1, system B software 108-2, and system C software 108-3 may store other code 114-1, 114-2, and 114-3, respectively, which may perform other non-communication activities.

Figure 1B:
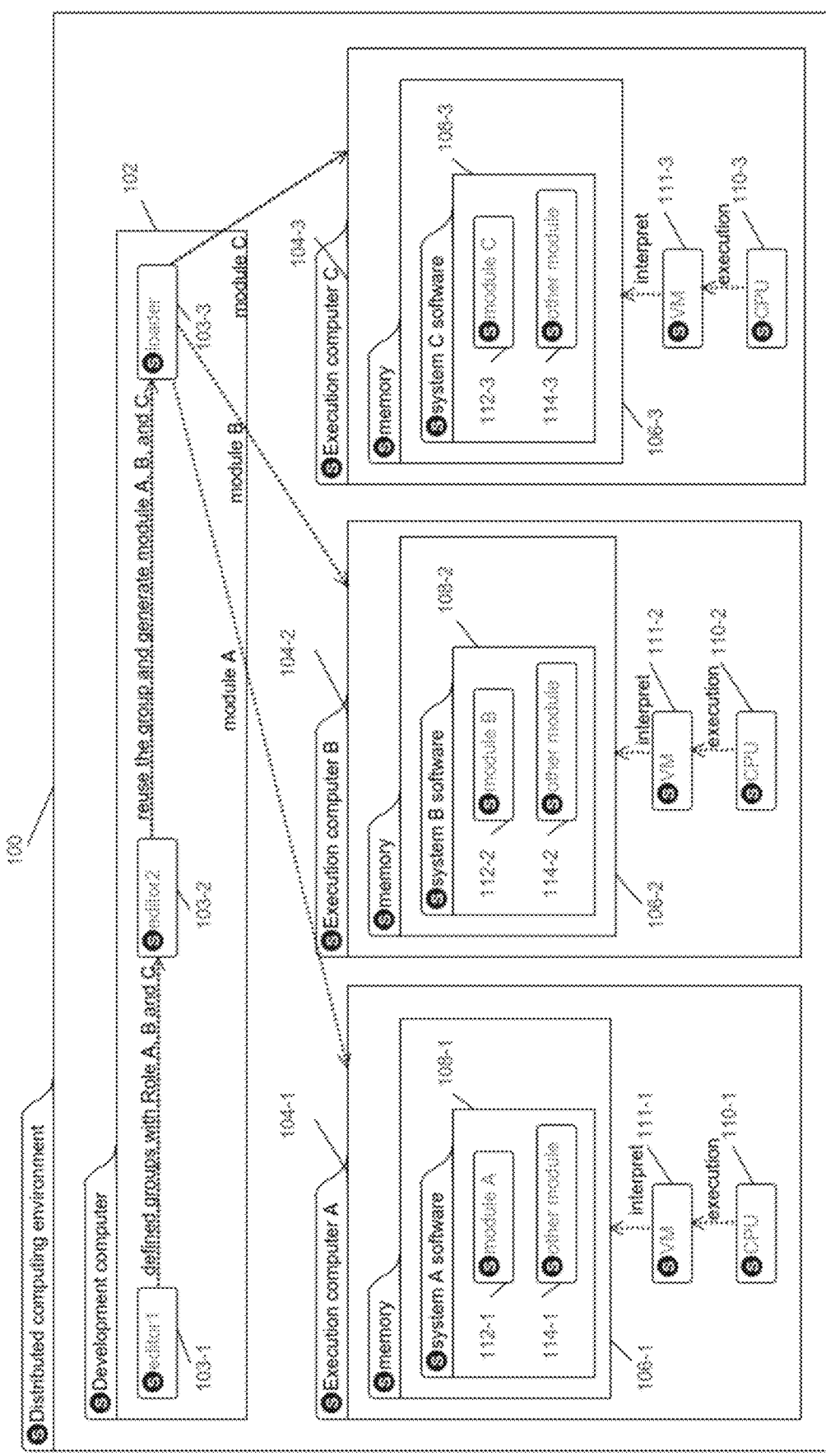
FIG. 1B depicts a distributed computing environment with Virtual Machines in each execution computers for designing multiple interacting software systems according to some embodiments.

FIG. 1B depicts a similar distributed computing environment 100 for designing multiple interacting software systems according to some other embodiments. The main difference between these two kinds of environments is that a software interaction module 112 and other modules 114 loaded into execution computer A, B, and C are software specifications that can be interpreted by a Virtual Machine (VM) 111, which is executed directly by a CPU 110 instead of computer code loaded into execution computer A, B, and C that is directly executed by a CPU. In another embodiments, execution computers with and without VM 111 can be mixed in the same distributed computing environment.

Protocol Example

Figure 2:
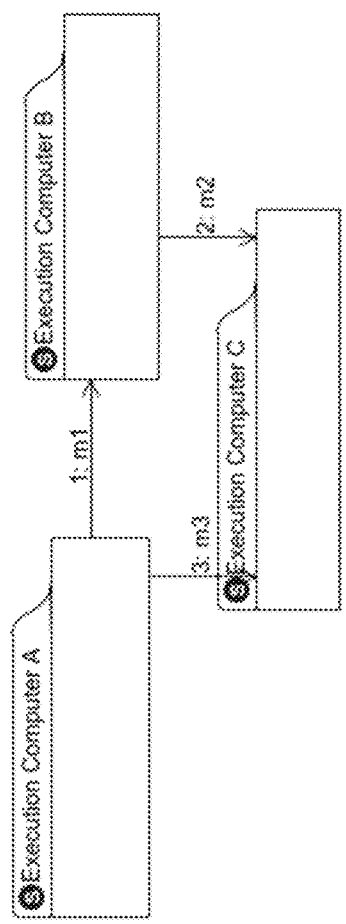
FIG. 2 shows an example protocol "protol" that describes activities that include passing three messages among execution computer A, execution computer B, and execution computer C.

FIG. 2 shows an example protocol "proto1" that describes activities that include passing three messages among execution computer A 104-1, execution computer B 104-2, and execution computer C 104-3. For example, the protocol specifies that execution computer A 104-1 first sends message "m1" to execution computer B 104-2, then execution computer B 104-2 sends message "m2" to execution computer C 104-3, and finally execution computer A 104-1 sends message "m3" to execution computer C 104-3. Other variations of the protocol may also be appreciated, such as additional messages may be sent, messages may be sent in different orders or to different execution computers, etc.

Figure 3:
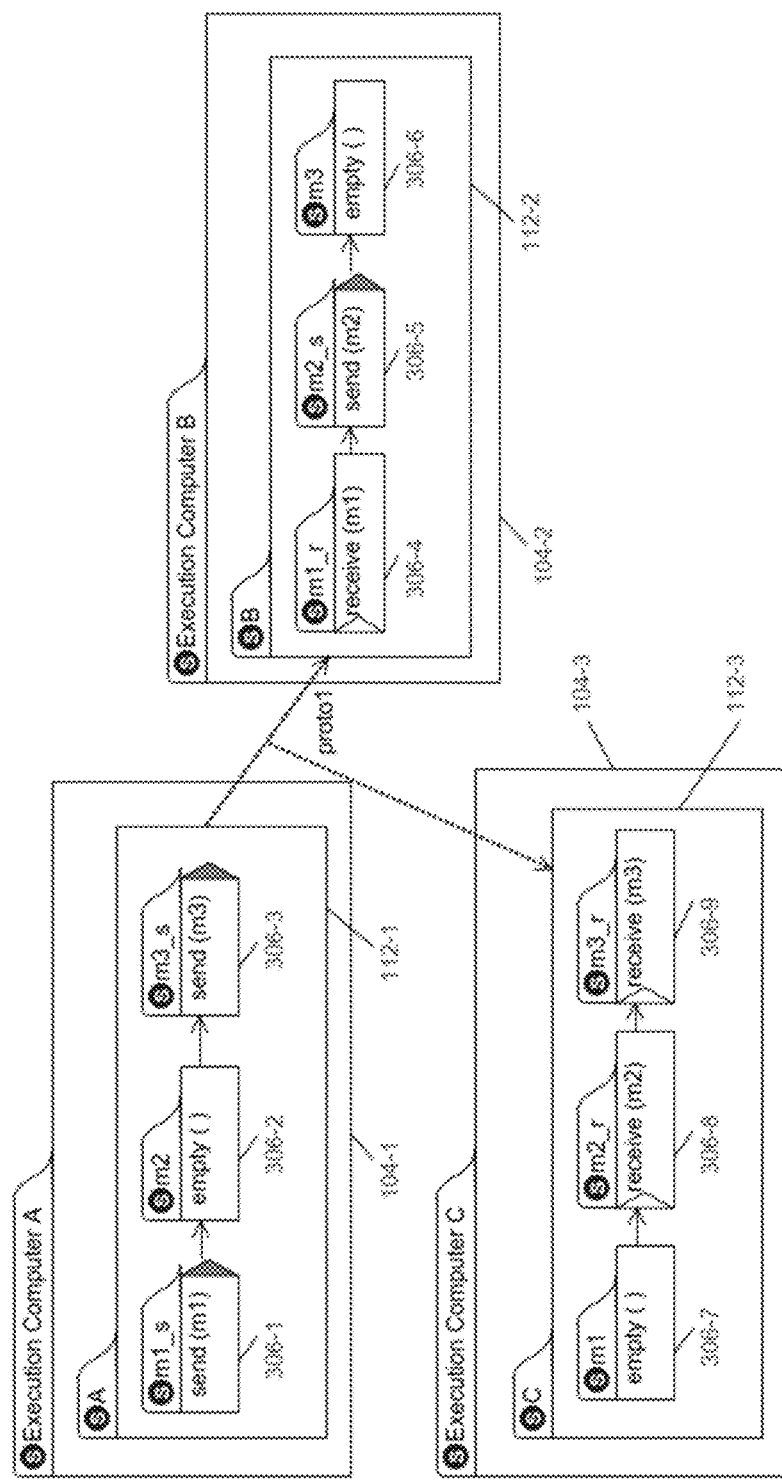
FIG. 3 depicts the interaction module each execution computer needs in order to inter-operate according to protocol "protol" according to some embodiments.

FIG. 3 depicts the interaction module each execution computer needs in order to inter-operate according to protocol "proto1" according to some embodiments. The protocol "proto1" sends and receives three messages m1, m2, and m3. Interaction modules 112 for each execution computer 104 may include an action 306 for each message. However, if an execution computer is not participating in the sending and receiving of a message, that execution computer 104 may not include an action for the message, may include an empty action, or another action that does not participate in the sending of the message. Each action may include an act that is performed, such as send, receive, empty, and so on. The action defines the activity that a respective execution computer 104 performs in the protocol.

In some examples, interaction module A 112-1 is loaded into execution computer A 104-1, and includes actions 306 that perform activities for the protocol. Action "m1_s" 306-1 includes a function that sends out message "m1" to execution computer B 104-2. Then, action "m2" 306-2 does nothing with regard to message "m2" since message "m2" is sent from execution computer B 104-2 to execution computer C 104-3 and does not involve execution computer A 104-1. Finally, action "m3_s" 306-3 includes a function that sends out message "m3" to execution computer C 104-3.

Also, interaction module B 112-2 is loaded into execution computer B 104-2, where action "m1_r" 306-4 includes a function that receives message "m1" from execution computer A 104-1, and then action "m2_s" 306-5 includes a function that sends out "m2" to execution computer C 104-3. Finally, action "m3" 306-6 does nothing with regard to message "m3", since message "m3" is sent from execution computer A 104-1 to execution computer C 104-3 and does not involve execution computer B 104-2.

Interaction module C 112-3 is loaded into execution computer C 104-3, where action "m1" 306-7 does nothing with regard to message "m1", since message "m1" is sent from execution computer A 104-1 to execution computer B 104-2 and does not involve execution computer c 104-3. Then, action "m2_r" 306-8 includes a function that receives message "m2" from execution computer B 104-2. Finally, action "m3_r" 306-9 includes a function that receives message "m3" from execution computer A 104-1.

Figure 4:
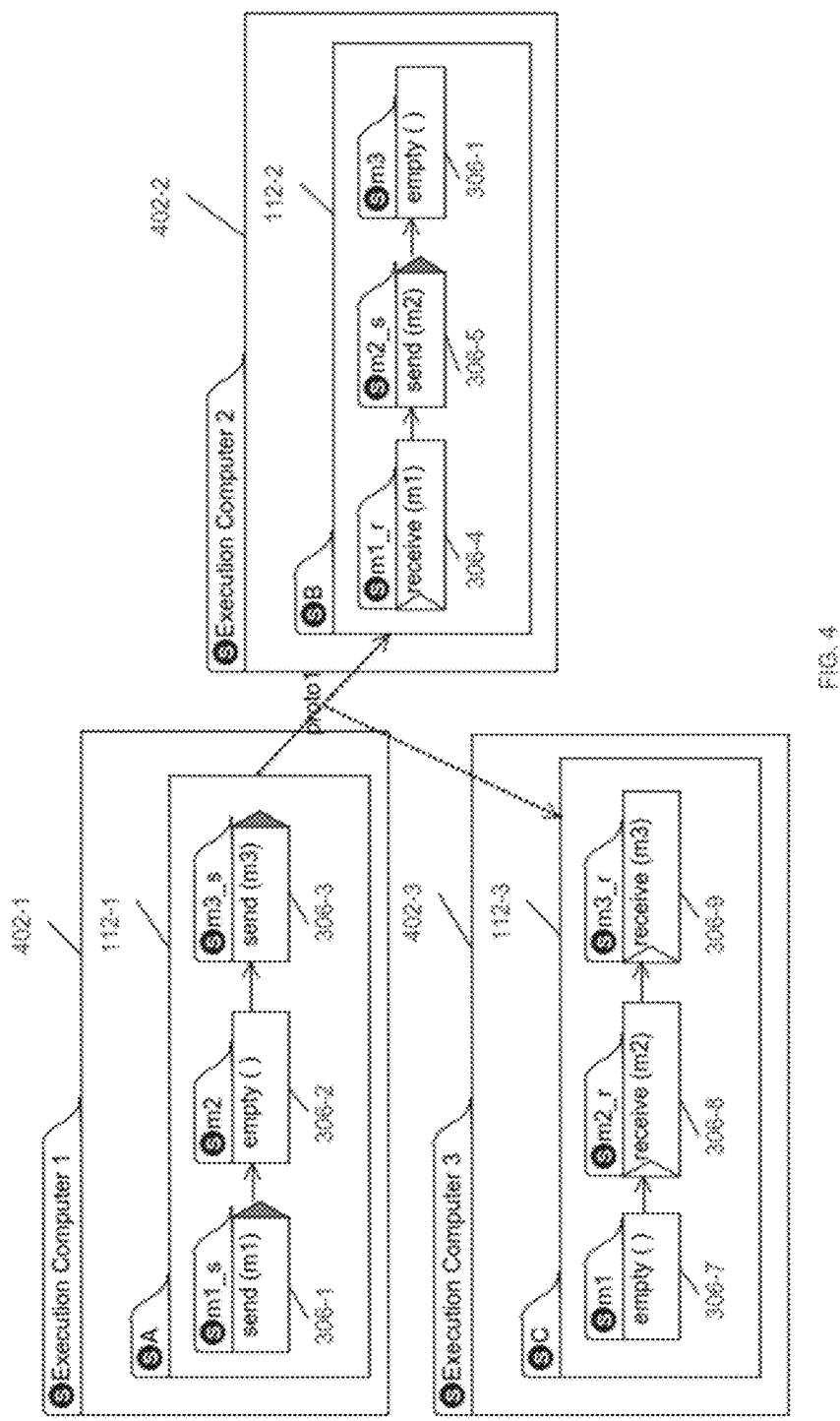
FIG. 4 shows that other execution computers 1, 2 and 3 may have a similar need to interact with each other based on the same protocol "protol" according to some embodiments.

FIG. 4 shows that other execution computers 1, 2 and 3 may have a similar need to interact with each other based on the same protocol "proto1" according to some embodiments. In order to inter-operate correctly, each execution computer 402-1, 402-2, and 402-3 also needs the same respective interaction module. In this example, execution computer 1 402-1 includes interaction module A 112-1, execution computer 2 402-2 includes interaction module B 112-2, and execution computer 3 402-3 includes interaction module C 112-3. For example, loader 103-3 loads respective interaction modules into respective execution computers. This allows different computer systems to use the same protocol.

Figure 5:
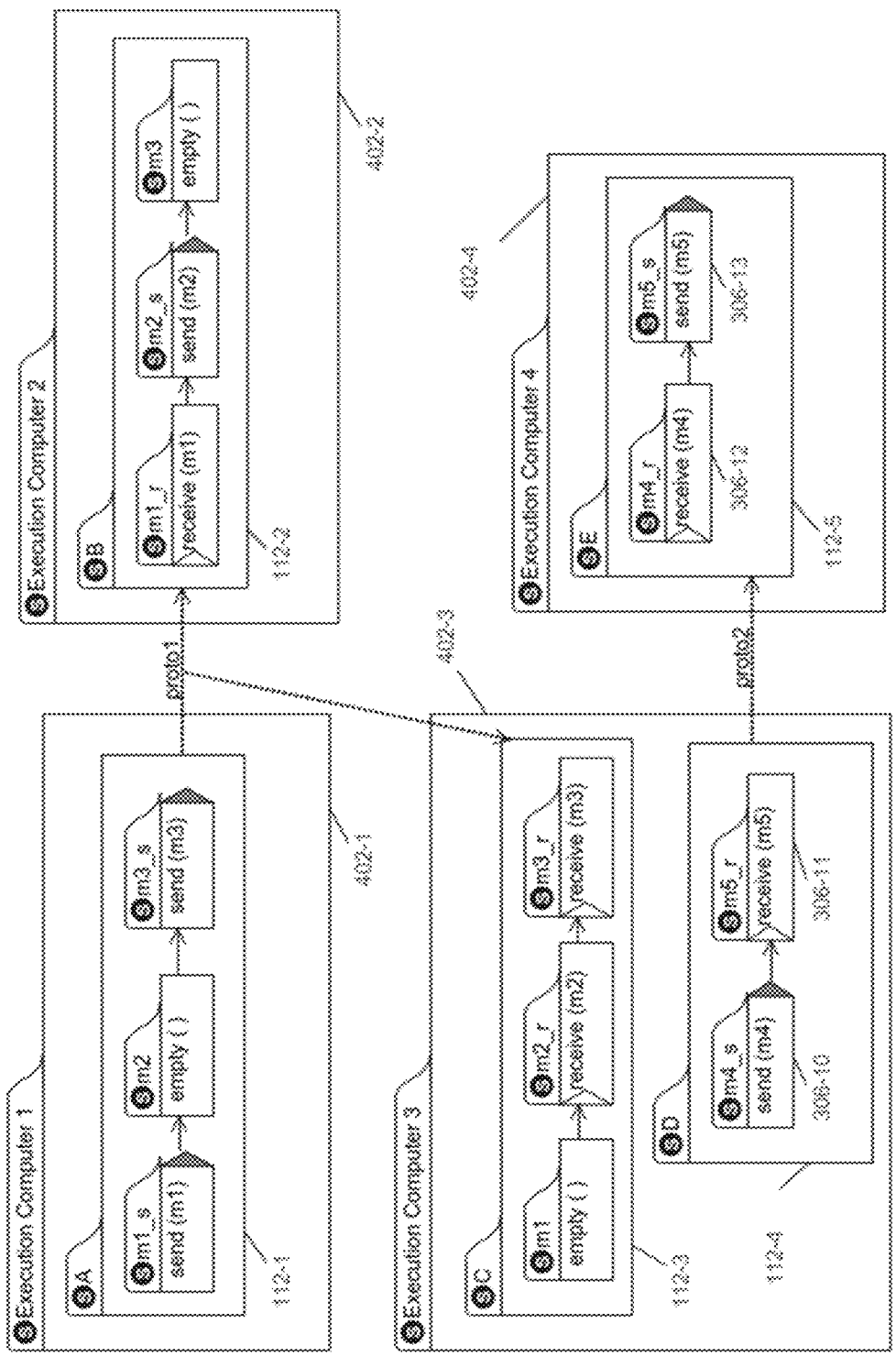
FIG. 5 depicts the interaction between execution computer 1, execution computer 2, and execution computer 3 according to some embodiments.

FIG. 5 depicts the interaction between execution computer 1 402-1, execution computer 2 402-2, and execution computer 3 402-3 according to some embodiments. Execution computer 1 402-1, execution computer 2 402-2, and execution computer 3 402-3 interact based on protocol "proto1". In addition, execution computer 3 402-3 also interacts with execution computer 4 402-4 based on protocol "proto2". Protocol "proto2" includes interaction modules 112-4 and 112-5. Interaction module 112-4 includes actions m4_s 306-10 and m5_r 306-11 to process messages m4 and m5, such as to send message m4 and receive message m5. Interaction module 112-5 includes actions m4_r 306-12 and m5_r 306-13 to process messages m4 and m5, such as to receive message m4 and send message m5. These interaction modules 112-4 and 112-5 are loaded into each execution computer 3 and 4, respectively in order for them to interoperate correctly according to protocol "proto2".

Inheritance Using Groups

In a typical Internet of Things (IoT) environment there can be over billions of sensors, computers, servers, and equipment who need to inter-operate with each other. In order for them to inter-operate, thousands or even millions of interaction module types need to be developed and loaded into each computing device. One way to develop software for such an environment is to design some reusable interaction modules, and then use an inheritance mechanism to copy all the actions in these reusable interaction modules into the software for each different type of computers. But, inheriting each interaction module individually for so many execution computers, each of which has needs for many different types of interaction modules, can be an error prone process. Some embodiments add another higher level abstraction called interaction groups to group multiple related interaction modules together so that each execution computer can inherit interaction modules based on the roles it plays in the interaction group to ensure that appropriate interaction modules will be developed without errors.

Figure 6:
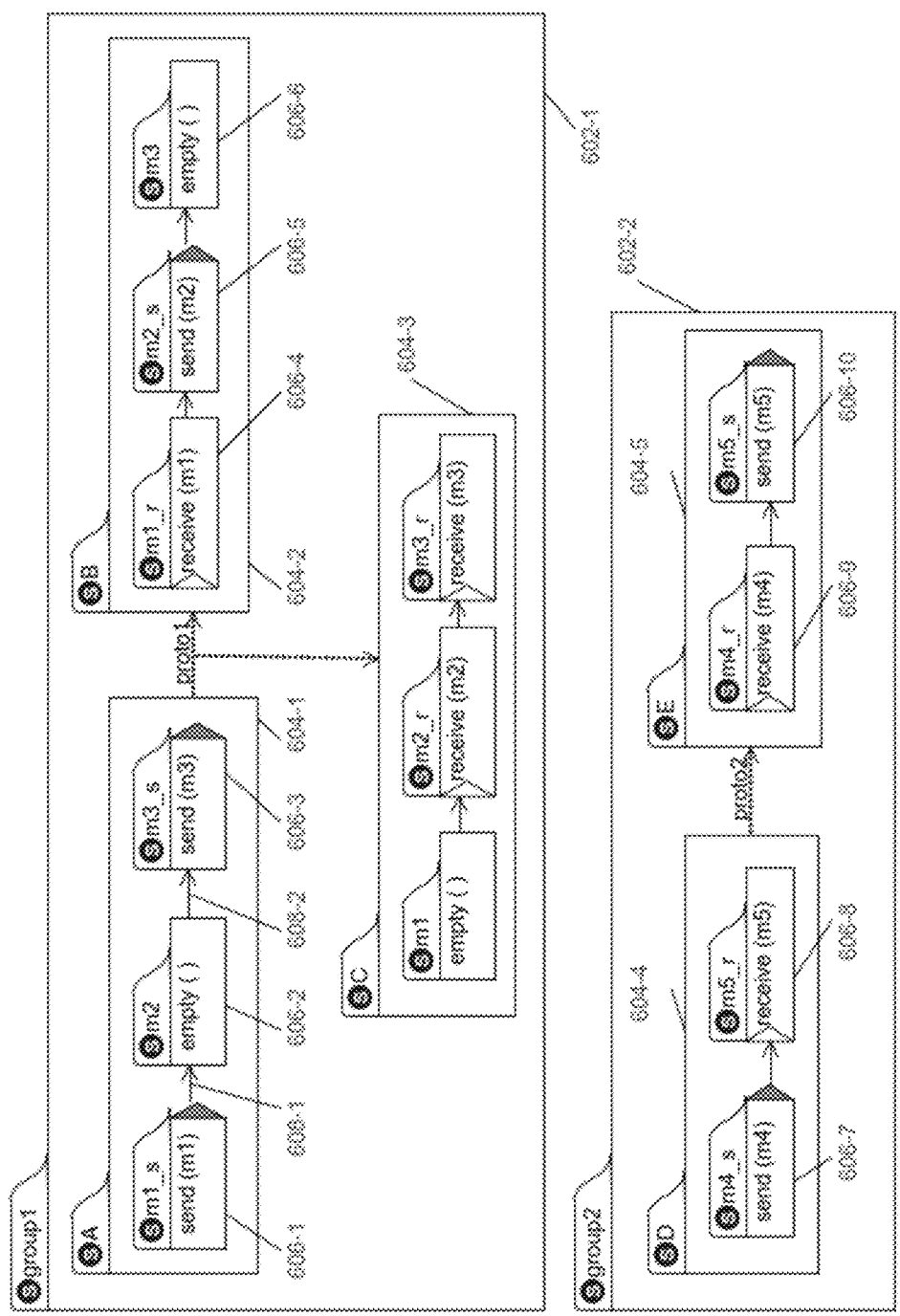
FIG. 6 depicts roles in reusable interaction groups according to some embodiments.

FIG. 6 depicts roles 604 in interaction groups 602 according to some embodiments. The method for defining a reusable interaction group and subsequently reusing the reusable interaction group in software systems includes: first, editor1 103-1 creates a named reusable interaction group 602-1 with multiple named roles, such as roles A 604-1, role B 604-2 and role C 604-3.

Each role 604 is created as an interaction module with multiple named actions and their execution order relationships. In one embodiment, role A is defined with three named actions 606-1, 606-2 and 606-3 and their execution order relationships 608-1 and 608-2. Each named action may perform an act, such as either send out a message 606-1, receive a message 606-3, or do something unrelated to any message 606-2. Other actions may also be appreciated. Execution order relationships 608 may specify the order of execution between actions 606. For example, execution order relationship 608-1 specifies action 606-1 comes before action 606-2, and execution order relationship 608-2 specifies action 606-2 comes before action 606-3. How many actions an interaction module has depends on the specification of the protocol, which may be different from application to application. For example, if the protocol has four messages, each of its corresponding modules 604 has four actions. And, if the protocol specifies five messages being exchanged among three roles, each role would have five actions.

Editor1 103-1 also creates a named reusable interaction group 602-2 with multiple named roles, such as role D 604-4 and role E 604-5. The roles communicate with each other according to a protocol, such as "proto2" and the roles are identified individually by their names, such as by role D 604-4 and role E 604-5. Each interaction module 604 includes actions 606 to handle messages specified in the protocol.

Figure 7:
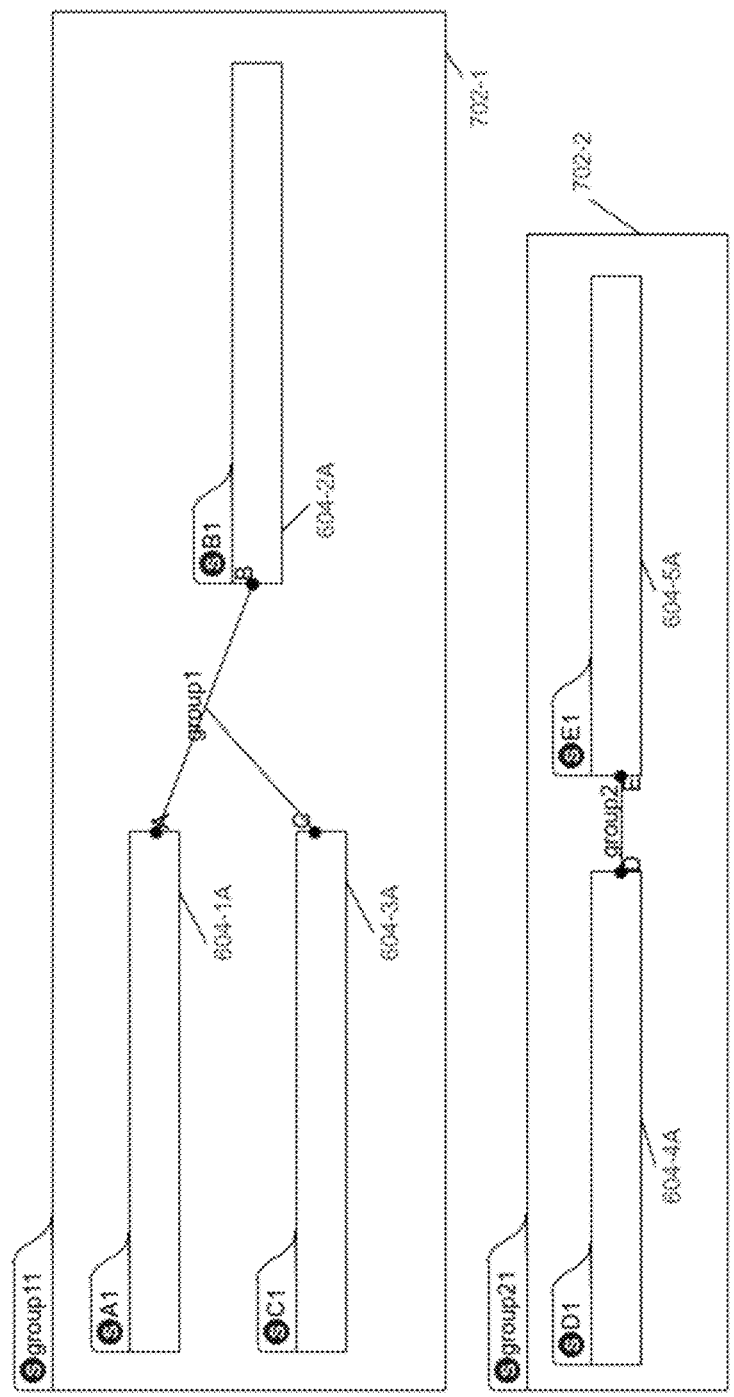
FIG. 7 depicts an example of reusing reusable interaction groups according to some embodiments.

The interaction groups 602 may then be reused. FIG. 7 depicts an example of reusing interaction groups according to some embodiments. First, editor2 103-2 creates a new interaction group "group11" 702-1 with multiple interaction modules "A1" 604-1A, "B1" 604-2A and "C1" 604-3A. The new interaction group identifies a previously defined reusable interaction group 602-1 by specifying the group's name, such as "group1". Then, each of the new interaction group's interaction modules A1 604-1A, B1 604-2A, and C1 604-3A inherits from a previously defined role identified by the role's name. Each of these interaction modules in the new interaction group is connected together by a link, where the reusable interaction group name is specified next to the link, and the role name is specified next to the interaction module. For example, interaction module "A1" is specified with Role A, hence, inherits from Role "A" in "group1", interaction module "B1" is specified with Role B, hence, inherits from Role "B" in "group1", and interaction module "C1" is specified with Role C, hence, inherits from Role "C" in "group1".

Then, editor2 103-2 determines which interaction software module in the reusable interaction group 602-1 is associated with the named roles 604-1, 604-2 and 604-3, and generates interaction modules 604-1A, 604-2A and 604-3A in the new interaction group 602-1 by copying each action, such as 606-1, 606-2 and 606-3, and their execution order relationships, such as 608-1 and 608-2, in the named role 604 into these interaction modules. Editor2 103-2 performs the same actions for group 2 to generate modules 604-4A and 604-5A.

Figure 8:
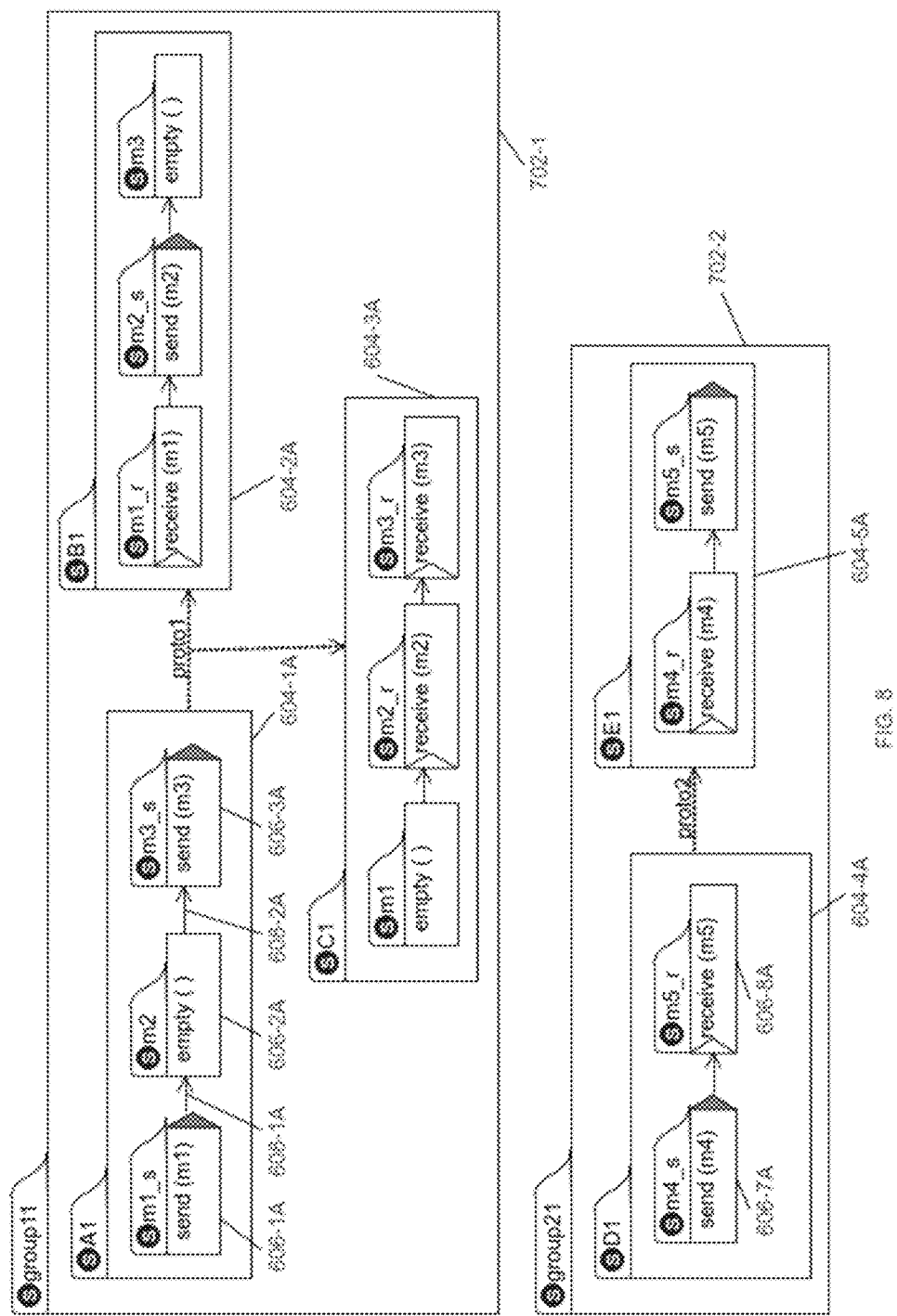
FIG. 8 depicts the inheritance of the actions of the roles according to some embodiments.

The effect of this Multi-role Group Inheritance is that each interaction software module defined in the reusable interaction group has now been inherited in the definition of its corresponding role in the new interaction group. FIG. 8 depicts the inheritance of the actions of the roles according to some embodiments. For example, interaction module 604-1A now contains action 606-1A, 606-2A, and 606-3A and their execution order relationships 608-1A and 608-2A, which are inherited from the corresponding role 604-1 in the reusable interaction group 602-1.

Similarly, interaction module 604-2A and 604-3A in the new interaction group 702-1 and interaction module 604-4A and 604-5A in the new interaction group 702-2 can be generated by editor2 103-2 with corresponding actions and execution order relationships, which are inherited from the corresponding role 604 in the reusable interaction group 602.

Figure 9:
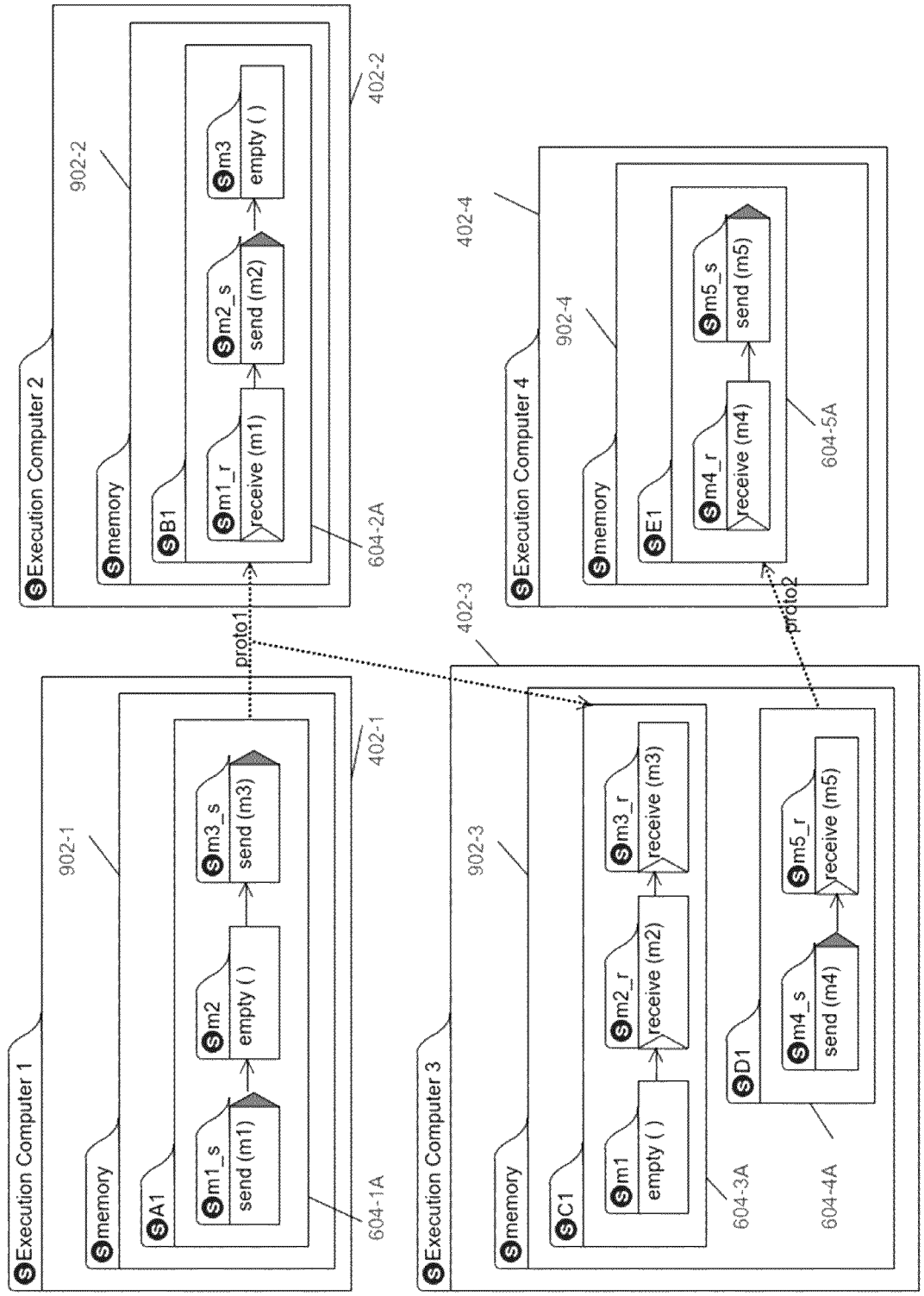
FIG. 9 depicts an example of loaded interaction modules into execution computers according to some embodiments.

FIG. 9 depicts an example of loaded interaction modules 702-1 and 702-2 into execution computers 402-1, 402-2, 402-3, and 402-4 according to some embodiments. Loader 103-3 loads generated interaction module 604-1A into a memory 902-1 of execution computer 1 402-1 as interaction module "A1" 604-1, generated interaction module 604-2A into a memory 902-2 of execution computer 2 402-2 as interaction module "B1" 604-2A, generated interaction modules 604-3A and 604-4A into a memory 902-3 of execution computer 3 402-3 as interaction modules "C1" 604-3A and "D1" 604-4A, and generated interaction module 604-5A into a memory 902-4 of execution computer 4 402-4 as interaction module "E1" 604-5A. When these execution computers start running, since these loaded interaction modules 604-1A, 604-2A, 604-3A, 604-4A and 604-5A are correctly generated by this method and inherited by the correct execution computers, these execution computers can interoperate with each other without exchanging wrong messages or in a wrong order using the interaction modules.

An interaction group, a role in a reusable interaction group, an interaction module in a new interaction group, and each action in the new interaction group generally can be identified by a name or identifier, which can be a string of characters or another means, such as a number, a symbol or a combination of characters, symbols and numbers. Each execution computer 402 can be assigned an identifier for a role. For instance, execution computer 1 402-1 is assigned role A1 in group protol, execution computer 2 402-2 is assigned role B1 in group protol, and execution computer 3 402-3 is assigned role C1 in group protol. Also, execution computer 3 402-3 is assigned role D1 in group proto2 and execution computer 4 402-4 is assigned role E1 in group proto2. Thus, execution computer 3 402-3 is assigned two roles of C1 and D1 in different groups.

The difference between conventional inheritance and using the Multi-role Groups Inheritance is that the conventional inheritance defines how each software module inherits from another software module individually, whereas the Multi-role Group Inheritance allows a whole group of modules inheriting their corresponding activities by their designated roles all at the same time. In other words, the multi-role Group Inheritance specifies a new higher level abstraction over the conventional inheritance for grouping a number of related modules that can be inherited all at the same time by another group of modules. In the emerging IoT environment, the Multi-role Group Inheritance mechanism can drastically reduce communication errors among millions of connected devices because interaction modules in devices interacting with each other are grouped together by this higher level abstraction.

Use of Different Actions than that Defined in a Group

Figure 10:
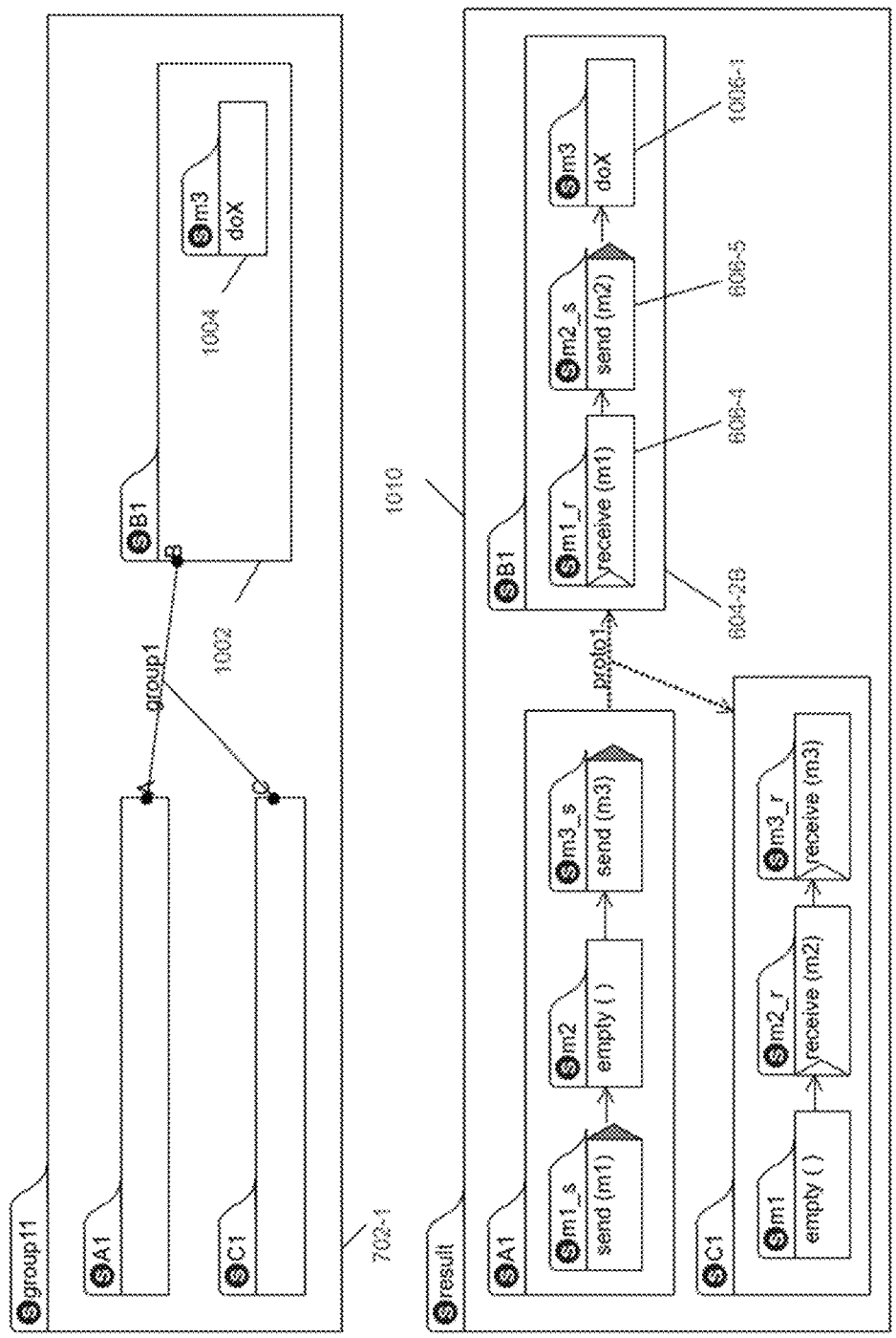
FIG. 10 depicts an example of replacing an action in an interaction group according to some embodiments.

FIG. 10 depicts an example of replacing an action in an interaction group according to some embodiments. For example, one interaction module "B1" 1002 in interaction group11 702-1 may need to define an action 1004 that is different from the one defined in the reusable interaction group "group1" 602-1. In this case, editor1 103-1 creates a new replacement action 1004 in interaction module 1002 in a new interaction group 702-1. This new action uses the same name, such as "m3", as the original one to be replaced to indicate which action to replace. Then, editor2 103-2 generates interaction module "B1" 604-2B in new interaction group 1010 by copying each action 606-4, 606-5 and 606-6 in the said named Role "B" 1002 into interaction module "B1" 604-2B. Then, editor2 103-2 replaces action "m3" with the replacement action 1006-1. Now the interaction module "B1" 604-2B has inherited Role "B" from the reusable interaction group "group1" with the replacement action "m3" 1006-1. Here, instead of an "empty" activity, an activity of "doX" is included in action "m3". The replacement allows interaction modules to be quickly customized while still using the reusable groups.

Adding an Additional Action to an Interaction Module

Figure 11:
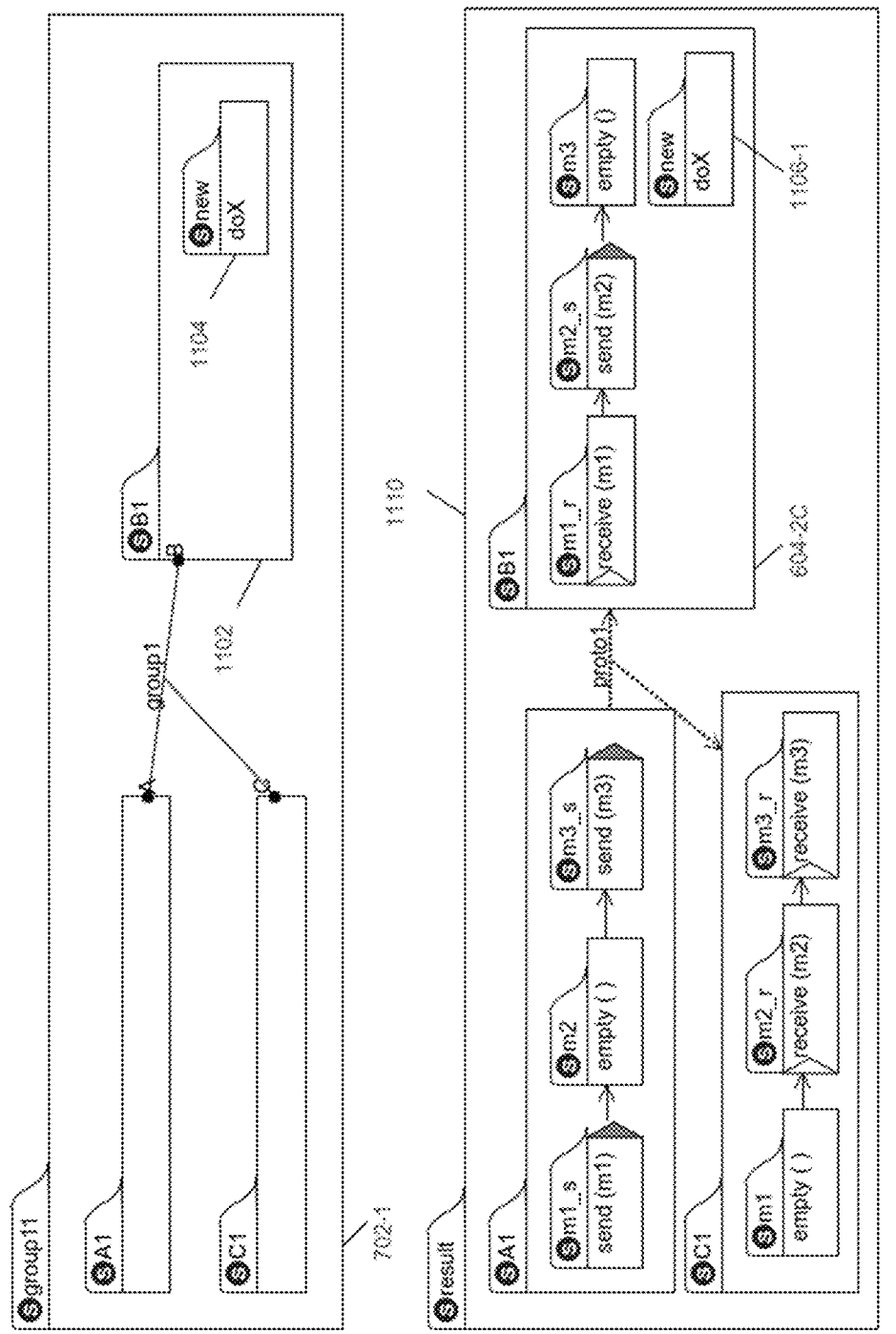
FIG. 11 depicts adding an additional action to an interaction module according to some embodiments.

FIG. 11 depicts adding an additional action to an interaction module according to some embodiments. For example, one interaction module "B 1" 1102 may need to define an additional action that is not defined in the reusable interaction group "group1" 602-1. In this case, editor1 103-1 creates a new additional action 1104 in interaction module 1102 in the new interaction group 702-1. In order to differentiate addition from replacement, this new action uses a name, such as "new", that is different from all original action names in the reusable interaction group. Then, editor2 103-2 generates interaction module "B1" 604-2C in new interaction group 1110 by copying each action 706-1, 706-2 and 706-3 in the said named role "B" 704-1 into interaction module "B1" 604-2C, and then add the new additional action "new" 1106-1. Now the interaction module "B1" 604-2C has inherited Role "B" from the reusable interaction group "group1" with the additional action "new" 1106-1.

The above-mentioned method can be extended by adding one or more template parameters in the reusable interaction group so that any new interaction group can pass some actual parameters and have interaction modules generated, wherein each template parameter is replaced by its corresponding actual parameter.

Figure 12:
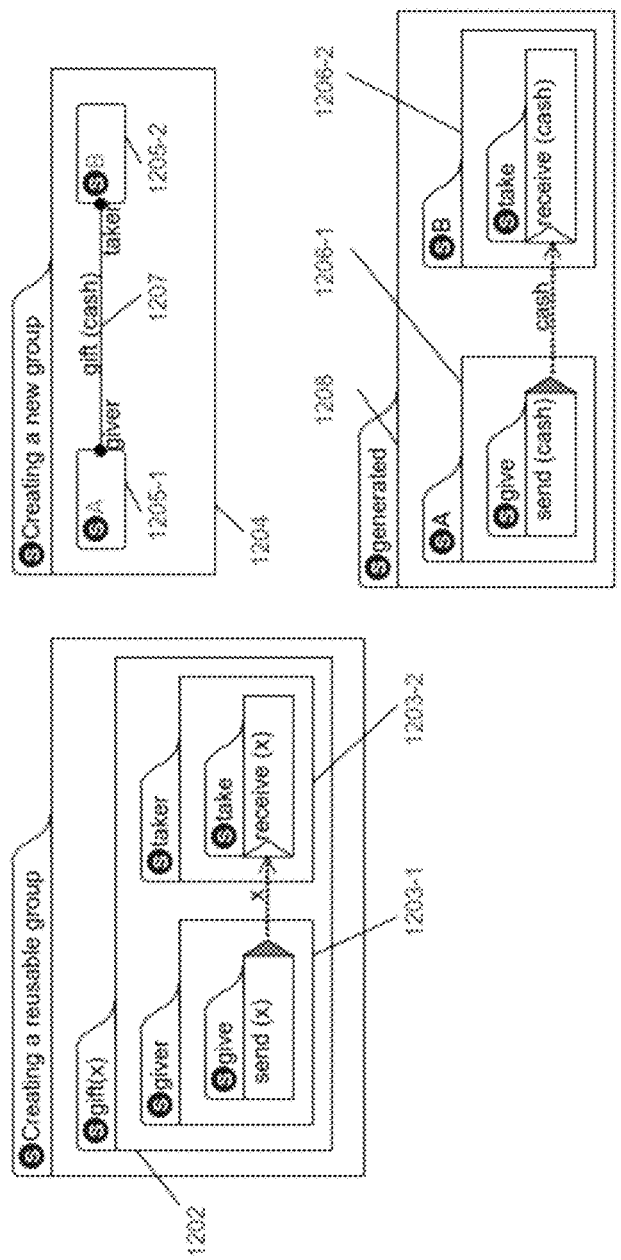
FIG. 12 depicts an example of generating a new interaction group according to some embodiments.

FIG. 12 depicts an example of generating a new interaction group according to some embodiments. The extended method for defining a reusable interaction group with parameters and subsequently reusing the reusable interaction group in software systems includes: first, editor1 103-1 creates a named reusable interaction group "gift" 1202 in FIG. 12 with a template parameter "x". The interaction group "gift(x)" has two named roles "giver" 1203-1 and "taker" 1203-2, wherein role "giver" has an action sending out "x", while Role "taker" has an action receiving "x".

Then, editor2 103-2 creates a new interaction group 1204 with an interaction module "A" 1205-1 and an interaction module "B" 1205-2. Then, the new interaction group 1204 identifies the previously defined reusable interaction group 1202 by specifying the reusable group's name "gift" with an actual parameter "cash" at 1207, and interaction module "A" inherits from Role "giver" and interaction module "B" inherits from Role "taker".

Then, editor2 103-2 determines which interaction software module in the new interaction group 1204 is associated with each of these named roles in the reusable interaction group and generates interaction modules 1206-1 and 1206-2 in the new interaction group 1208 by copying each action in the named role 1203-1 and 1203-2 into these interaction modules while replacing the template parameter "x" by the actual parameter "cash".

Figure 13:
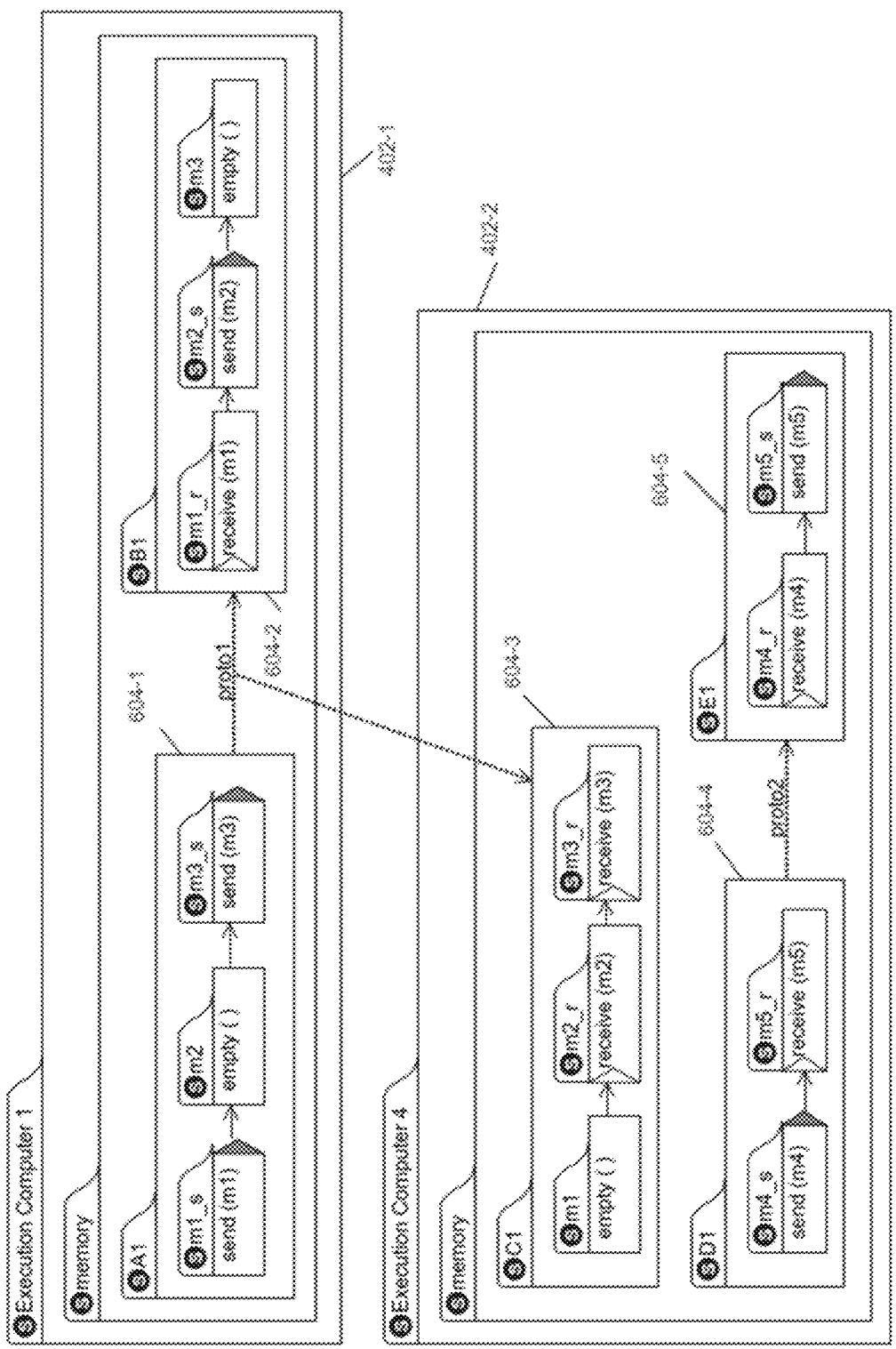
FIG. 13 shows one embodiment where some generated interaction modules are loaded into execution computer 1, and other generated interaction modules are loaded into execution computer 4.

The generated interaction modules may be memory space independent in that the modules can be loaded into either the same memory space or different memory spaces while maintaining their capabilities of communicating with each other. Hence, there may be no restriction in the number of devices nor their physical locations in which those generated interaction modules are loaded. Some generated interaction modules may be loaded into the same memory space in the same execution computer, and others may be loaded into different memory space in the same or different execution computers. FIG. 13 shows one embodiment where generated interaction modules 604-1 and 604-2 are loaded into execution computer 1 402-1, and generated interaction modules 604-3, 604-4, and 604-5 are loaded into execution computer 2 402-2. When these execution computers start running, since these loaded interaction modules are correctly generated by this method, these execution computers can interoperate with each other without exchanging wrong messages or in a wrong order.

Interaction modules may not put any restriction on what acts in actions in each interaction module perform. While some embodiments create interaction modules for execution computers to inter-operate with each other by exchanging messages, other embodiments may use the same Multi-role Group Inheritance mechanism to create interaction software modules for other purposes.

Figure 14:
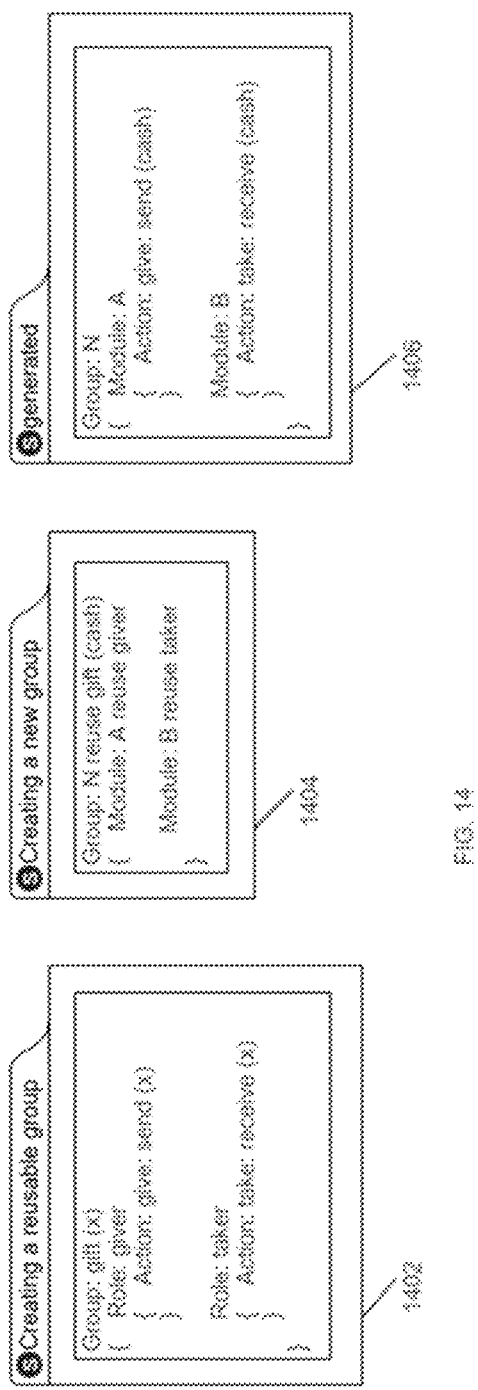
FIG. 14 depicts an example of creating reusable and new interaction groups in a textual language, and subsequently generating the activity in interaction modules of the new interaction group by copying the activity defined in corresponding roles in the reusable interaction group according to some embodiments.

Some embodiments create reusable and new interaction groups in diagrams as have been described above, and generate interaction modules in various computer executable code, such as Java, with functions equivalent to performing the acts defined in actions of the interaction modules. In some embodiments, these reusable and new interaction groups can be created in a textual language instead of in diagrams. FIG. 14 depicts such an example of creating reusable and new interaction groups in a textual language, and subsequently generating actions of interaction modules according to some embodiments. Editor1 103-1 creates a reusable interaction group "gift (x)" 1402. Reusable interaction group "gift (x)" 1402 includes a role of "giver" with an action of "give: send(x)". Also, reusable interaction group "gift (x)" 1402 includes a role of "taker" and an action of "take: receive (x)". Reusable interaction group "gift (x)" 1402 thus defines two roles, with each role having an action that performs an act. The function send (x) may be defined in software code and may perform an act of sending out the message x. The function receive (x) may be defined in software code and may perform an act of receiving the message x.

Then, Editor2 103-2 creates a new interaction group "N" 1404 by reusing group "gift (x)" 1402 with an interaction module "A" reusing the role "giver" and an interaction module "B" reusing the role "taker". Editor2 103-2 may define the variable x as "cash", such as a monetary amount. Instead of recreating the actions of "give" and "take", Editor2 103-2 generates interaction modules "A" and "B" in the new interaction group "N" 1406 by copying each action in the named role "giver" and "taker" into these interaction modules while replacing the template parameter "x" by the actual parameter "cash". These generated interaction modules can be loaded into different computers as described earlier. In addition, some embodiments do not prevent creating reusable interaction groups and new interaction groups reusing those reusable interaction groups in a combination of a diagram and a textual language.

EXAMPLE EMBODIMENTS

In some embodiments, a method comprising: receiving, by a computing device, a first interaction group that includes a plurality of roles, wherein the plurality of roles comprise a first plurality of interaction modules that each define an activity; receiving, by the computing device, a second interaction group that includes a second plurality of interaction modules, wherein the second interaction group identifies the first interaction group, and interaction modules in the second plurality of modules identify a role in the plurality of roles of the first interaction group; and generating, by the computing device, an activity of the second plurality of interaction modules for the second interaction group by retrieving the activity of an interaction module in the first plurality of interaction modules identified by a respective role for the interaction module in the second plurality of interaction modules.

In some embodiments, the activity that each interaction module performs comprises a plurality of actions.

In some embodiments, a first action in a first interaction module comprises a communication with a second action in a second interaction module.

In some embodiments, order relationships specify an execution order between the plurality of actions for each interaction module.

In some embodiments, an action in a first interaction module does not communicate with a second action in a second interaction module.

In some embodiments, the method further comprising: sending a software specification for a respective activity in the interaction module in the second plurality of interaction modules to each respective execution computer.

In some embodiments, an action in an interaction module in the second plurality of interaction modules is replaced by a new action.

In some embodiments, a new action is added to an interaction module in the second plurality of interaction modules.

In some embodiments, the first interaction group includes a template parameter, and a value is included in the second interaction group for the replacement of the template parameter.

In some embodiments, the generated activity of the second plurality of interaction modules is loaded into a same memory space as used by the first plurality of interaction modules.

In some embodiments, the generated activity of the second plurality of interaction module is loaded into a different memory space for an interaction module in the second plurality of interaction modules from an interaction module in the first plurality of interaction modules.

In some embodiments, each interaction group in the first plurality of interaction modules is identified by a string.

In some embodiments, each role is identified by a string in the first plurality of interaction modules.

In some embodiments, the first plurality of interaction modules, the second plurality of interaction modules, the plurality of roles, and the activity are defined in a graphical language.

In some embodiments, the first plurality of interaction modules, the second plurality of interaction modules, the plurality of roles, and the activity are defined in a textual language.

In some embodiments, a non-transitory computer-readable storage medium having stored thereon computer executable instructions, which when executed by a computing device, cause the computing device to be operable for: receiving a first interaction group that includes a plurality of roles, wherein the plurality of roles comprise a first plurality of interaction modules that each define an activity; receiving a second interaction group that includes a second plurality of interaction modules, wherein the second interaction group identifies the first interaction group, and interaction modules in the second plurality of modules identify a role in the plurality of roles of the first interaction group; and generating an activity of the second plurality of interaction modules for the second interaction group by retrieving the activity of an interaction module in the first plurality of interaction modules identified by a respective role for the interaction module in the second plurality of interaction modules.

In some embodiments, the activity that each interaction module performs comprises a plurality of actions.

In some embodiments, the instructions are further operable for: sending a software specification for a respective activity in the interaction module in the second plurality of interaction modules to each respective execution computer.

In some embodiments, the first interaction group includes a template parameter, and a value is included in the second interaction group for the replacement of the template parameter.

In some embodiments, an apparatus comprising: one or more computer processors; and a computer-readable storage medium comprising instructions for controlling the one or more computer processors to be operable for: receiving a first interaction group that includes a plurality of roles, wherein the plurality of roles comprise a first plurality of interaction modules that each define an activity; receiving a second interaction group that includes a second plurality of interaction modules, wherein the second interaction group identifies the first interaction group, and interaction modules in the second plurality of modules identify a role in the plurality of roles of the first interaction group; and generating an activity of the second plurality of interaction modules for the second interaction group by retrieving the activity of an interaction module in the first plurality of interaction modules identified by a respective role for the interaction module in the second plurality of interaction modules.

System

FIG. 15 illustrates an example of special purpose computer systems 1500 according to one embodiment. Computer system 1500 includes a bus 1502, network interface 1504, a computer processor 1506, a memory 1508, a storage device 1510, and a display 1512.

Bus 1502 may be a communication mechanism for communicating information. Computer processor 1506 may execute computer programs stored in memory 1508 or storage device 1508. Any suitable programming language can be used to implement the routines of some embodiments including C, C++, Java, assembly language, etc. Different programming techniques can be employed such as procedural or object oriented. The routines can execute on a single computer system 1500 or multiple computer systems 1500. Further, multiple computer processors 1506 may be used.

Memory 1508 may store instructions, such as source code or binary code, for performing the techniques described above. Memory 1508 may also be used for storing variables or other intermediate information during execution of instructions to be executed by processor 1506. Examples of memory 1508 include random access memory (RAM), read only memory (ROM), or both.

Storage device 1510 may also store instructions, such as source code or binary code, for performing the techniques described above. Storage device 1510 may additionally store data used and manipulated by computer processor 1506. For example, storage device 1510 may be a database that is accessed by computer system 1500. Other examples of storage device 1510 include random access memory (RAM), read only memory (ROM), a hard drive, a magnetic disk, an optical disk, a CD-ROM, a DVD, a flash memory, a USB memory card, or any other medium from which a computer can read.

Memory 1508 or storage device 1510 may be an example of a non-transitory computer-readable storage medium for use by or in connection with computer system 1500. The non-transitory computer-readable storage medium contains instructions for controlling a computer system 1500 to be configured to perform functions described by some embodiments. The instructions, when executed by one or more computer processors 1506, may be configured to perform that which is described in some embodiments.

Computer system 1500 includes a display 1512 for displaying information to a computer user. Display 1512 may display a user interface used by a user to interact with computer system 1500.

Computer system 1500 also includes a network interface 1504 to provide data communication connection over a network, such as a local area network (LAN) or wide area network (WAN). Wireless networks may also be used. In any such implementation, network interface 1504 sends and receives electrical, electromagnetic, or optical signals that carry digital data streams representing various types of information.

Computer system 1500 can send and receive information through network interface 1504 across a network 1514, which may be an Intranet or the Internet. Computer system 1500 may interact with other computer systems 1500 through network 1514. In some examples, client-server communications occur through network 1514. Also, implementations of some embodiments may be distributed across computer systems 1500 through network 1514.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
storing, by a computing device, a first group that includes a plurality of roles in a memory, wherein the plurality of roles comprise software code for a first plurality of modules that each define an activity that is performed upon executing the software code;
storing, by the computing device, a second group that includes software code for a second plurality of modules in the memory, wherein the second group identifies the first group, and modules in the second plurality of modules identify a role in the plurality of roles of the first group; and
generating, by the computing device, software code for an activity of the second plurality of modules for the second group by retrieving the activity of a module in the first plurality of modules identified by a respective role for the module in the second plurality of modules, wherein the activity of the second plurality of modules is performed upon executing the software code for the activity.

2. The method of claim 1, wherein the activity that each module performs comprises a plurality of actions.

3. The method of claim 2, wherein:
a first action in a first module comprises a communication with a second action in a second module.

4. The method of claim 2, wherein:
order relationships specify an execution order between the plurality of actions for each interaction module.

5. The method of claim 2, wherein:
a first action in a first module does not communicate with a second action in a second module.

6. The method of claim 1, further comprising:
sending a software specification for a respective activity in the module in the second plurality of modules to each respective execution computer.

7. The method of claim 1, wherein an action in a module in the second plurality of modules is replaced by a new action.

8. The method of claim 1, wherein a new action is added to a module in the second plurality of modules.

9. The method of claim 1, wherein:
the first group includes a template parameter, and
a value is included in the second group for the replacement of the template parameter.

10. The method of claim 1, wherein the generated activity of the second plurality of modules is loaded into a same memory space in the memory as used by the first plurality of modules.

11. The method of claim 1, wherein:
the memory comprises a first memory space and a second memory space that is different from the first memory space,
the generated activity of the second plurality of modules for a first module in the second plurality of modules is loaded into the first memory space, and
a second module in the second plurality of modules is loaded into the second memory space.

12. The method of claim 1, wherein each group in the first plurality of modules is identified by a string.

13. The method of claim 1, wherein each role is identified by a string in the first plurality of modules.

14. The method of claim 1, wherein:
the first plurality of modules, the second plurality of modules, the plurality of roles, and the activity are defined in a graphical language.

15. The method of claim 1, wherein the first plurality of modules, the second plurality of modules, the plurality of roles, and the activity are defined in a textual language.

16. A non-transitory computer-readable storage medium having stored thereon computer executable instructions, which when executed by a computing device, cause the computing device to be operable for:

storing a first group that includes a plurality of roles in a memory, wherein the plurality of roles comprise software code for a first plurality of modules that each define an activity that is performed upon executing the software code;

storing a second group that includes software code for a second plurality of modules in the memory, wherein the second group identifies the first group, and modules in the second plurality of modules identify a role in the plurality of roles of the first group; and generating software code for an activity of the second plurality of modules for the second group by retrieving the activity of a module in the first plurality of modules identified by a respective role for the module in the second plurality of modules, wherein the activity of the second plurality of modules is performed upon executing the software code for the activity.

17. The non-transitory computer-readable storage medium of claim 16, wherein the activity that each module performs comprises a plurality of actions.

18. The non-transitory computer-readable storage medium of claim 16, further operable for:
sending a software specification for a respective activity in the module in the second plurality of modules to each respective execution computer.

19. The non-transitory computer-readable storage medium of claim 16, wherein:
the first group includes a template parameter, and
a value is included in the second group for the replacement of the template parameter.

20. An apparatus comprising:
one or more computer processors; and
a computer-readable storage medium comprising instructions for controlling the one or more computer processors to be operable for:

storing a first group that includes a plurality of roles in a memory, wherein the plurality of roles comprise software code for a first plurality of modules that each define an activity that is performed upon executing the software code;

storing a second group that includes software code for a second plurality of modules in the memory, wherein the second group identifies the first group, and modules in the second plurality of modules identify a role in the plurality of roles of the first group; and generating software code for an activity of the second plurality of modules for the second group by retrieving the activity of a module in the first plurality of modules identified by a respective role for the module in the second plurality of modules, wherein the activity of the second plurality of modules is performed upon executing the software code for the activity.

* * * * *